Dec. 14, 1954

R. H. KEITH 2,697,176

REVERSE POWER DETECTION

Filed Aug. 16, 1952

WITNESSES:

INVENTOR
Robert H. Keith
BY
ATTORNEY

Dec. 14, 1954

R. H. KEITH 2,697,176

REVERSE POWER DETECTION

Filed Aug. 16, 1952

WITNESSES:
John E. Hanley
Leon M. Garman

INVENTOR
Robert H. Keith
BY F. P. Lyle
ATTORNEY

United States Patent Office 2,697,176
Patented Dec. 14, 1954

2,697,176

REVERSE POWER DETECTION

Robert H. Keith, Lima, Ohio, assignor to Westinghouse Electric Corporation, East Pittsburgh, Pa., a corporation of Pennsylvania Application August 16, 1952, Serial No. 304,818

8 Claims. (Cl. 307—57)

The present invention relates to the detection of reverse power in a system of paralleled alternating-current generators, and more particularly to means for detecting and disconnecting a generator which is failing to carry its share of the load, or which is absorbing power from the system.

When two or more alternating-current generators are operated in parallel, as in the alternating-current systems used on large aircraft, for example, the generators must properly divide the load and it is desirable, and sometimes necessary, to determine when one generator is failing to carry its share of the load or is absorbing power from the system, and to disconnect the offending generator from the system. Such a condition may result from stopping or failure of the prime mover or driving means of one generator, causing the generator to run as a motor taking power from the system. Certain types of failure in the governor control of one generator may also cause this condition, since the division of real load between alternating-current generators in parallel is determined by the governor settings of their prime movers, and if the governor settings are not identical, the load will not divide equally between the generators. A failure in the governor control means which results in slowing down of one generator will, therefore, result in that generator failing to carry its proper share of the load, and may actually cause it to absorb power from the system. Reverse power may sometimes also result from mechanical failures, such as a generator developing a rub between the rotor and the stator which, under some circumstances, may cause the generator to absorb power from the system. Under any of these conditions, or any other condition which may cause reverse power, it is desirable to detect the existence of the condition and usually to disconnect the offending generator from the system.

The obvious way to detect reverse power would be by the use of a power directional relay with each generator, that is, a power responsive device of the wattmeter type, suitably polarized to respond to power flow in one direction only, so that the relay would operate to trip the generator circuit breaker upon the occurrence of power flow from the system to the generator. Such an arrangement, however, is not satisfactory for several reasons. In the drives used in aircraft systems, and in many other types of drives, an overrunning clutch is usually incorporated in the driving means of each generator. If the prime mover is stopped or fails, the generator will continue to run as a motor, drawing power from the system to supply its losses and the power required to slip the overrunning clutch. This would usually be a relatively small amount of power as compared to the full load power, and the reverse power relay would have to have a low enough setting to respond to this small amount of power. As indicated above, however, the division of load between generators in parallel is determined by the governor settings and if the settings are not identical, there will be some difference in the power outputs of different machines, and at light load or no load, one machine may be absorbing power from the system for this reason. The power taken from the system in this way may be as much as the power required to drive the overrunning clutch, so that if the reverse power relay were set low enough to operate on failure of the prime mover, it might also operate under no-load or light-load conditions when operation of the relay is not desired. This could result in cycling if automatic synchronizing of the generators is utilized, since the generator would be reconnected to the system as seen as it was tripped off and the relay would then operate again to trip the breaker and so on.

Another disadvantage of using relays which sense reverse power directly is that they may cause false tripping on certain types of faults in the governor control. Since load division between the generators is determined by the governor settings, means are usually provided in the governor control for maintaining proper load division. Failure of this means in the control of one governor may cause the governors of the other machines to respond in the same manner as though their machines were carrying too much load. Thus, the other machines will reduce their load and at least one may actually absorb reverse power if the governor settings are not identical. If this should happen, a reverse power relay on the machine absorbing power would cause the good generator to be removed from the system. Thus, the use of power directional relays is not a satisfactory solution of the problem of detecting reverse power.

The principal object of the present invention is to provide a simple and reliable means for detecting reverse power, or failure of one generator to carry its share of the load, in a system of paralleled alternating-current generators, which avoids the difficulties mentioned above.

Another object of the invention is to provide means for detecting reverse power, or failure of one generator to carry its share of the load, in a system of paralleled alternating-current generators, which responds to the difference in the power outputs of the several generators of the system, so that the desired sensitivity can be obtained without causing false tripping under any normally expected conditions of operation.

A further object of the invention is to provide means for detecting reverse power, or failure of one generator to carry its share of the load, in a system of paralleled alternating-current generators, which can be used in connection with a load dividing means incorporated in the governor control, thus providing a very simple and inexpensive means of obtaining the desired result.

Other objects and advantages of the invention will be apparent from the following detailed description, taken in connection with the accompanying drawing, in which.

Figure 1:
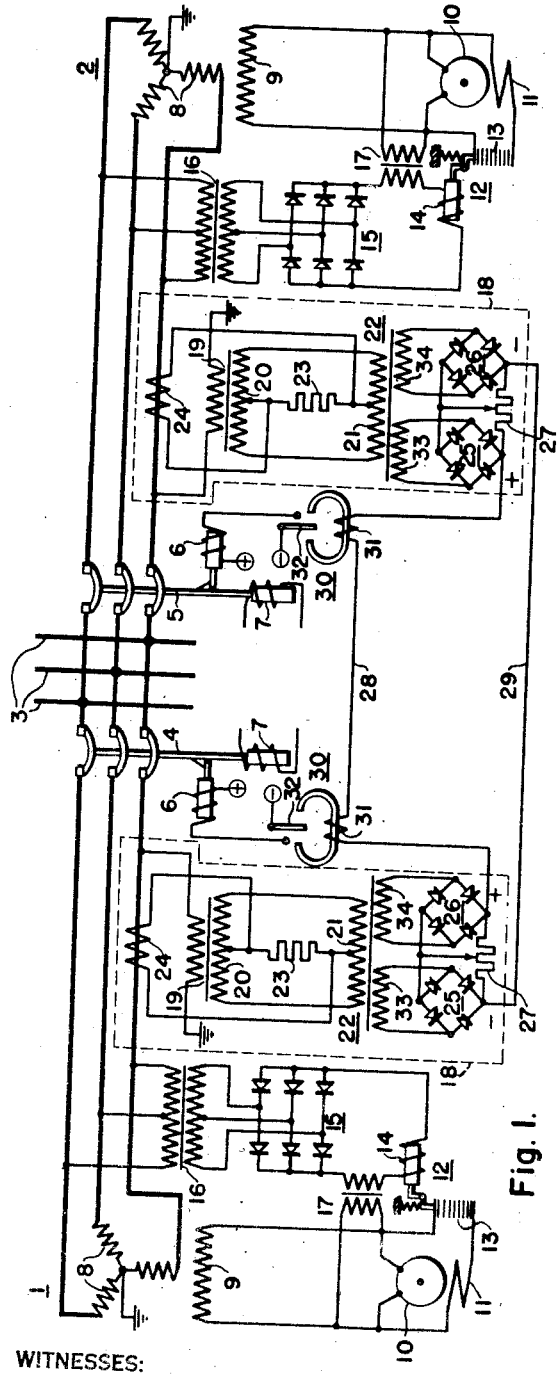
Figure 1 is a schematic wiring diagram showing the invention applied to a two-generator system.

The invention is shown in Fig. 1 applied to a system comprising two alternating-current generators 1 and 2 connected in parallel to a three-phase load bus 3 through circuit breakers 4 and 5, respectively. Each of the circuit breakers has a trip coil 6 controlled as described hereinafter, and a closing coil 7 which may be controlled manually or automatically in any desired manner. The generators 1 and 2 and their associated equipment are shown as being identical, and each generator is shown as a three-phase generator having phase windings 8, and a field winding 9 supplied with direct-current excitation from an exciter 10, which has a self-excited shunt field winding 11. The output voltage of the generator is controlled by a voltage regulator 12 which controls the shunt field current of the exciter 10 to control the exciter output voltage and thus the generator excitation. The voltage regulator 12 is shown as being of the carbon pile type, having a carbon pile 13 connected in series in the circuit of the exciter field winding 11, and compressed by a pressure mechanism of any suitable type actuated by a coil 14 acting in opposition to a spring. The coil 14 of the voltage regulator is energized from the output voltage of the generator through a three-phase rectifier bridge 15 and a transformer 16, so that it responds to the average of the three phase voltages of the generator. A stabilizing transformer 17 is preferably also provided having its primary winding connected across the exciter voltage and its secondary winding connected in series with the regulator coil 14.

In order to detect reverse power, or failure of either generator to carry its proper share of the load, each generator is provided with a power measuring means or network 18 which provides a direct-current output voltage proportional to the power of the generator. Any suitable power measuring means or network may be used for this purpose. The particular network shown includes a transformer 19 having its primary winding connected between one terminal of the generator and ground, so as to be energized by the voltage of one phase winding 8 of the generator. The secondary winding 20 of the transformer 19 is connected to the primary winding 21 of a transformer 22. A resistor 23 is connected between center taps of the transformer windings 20 and 21, and the secondary voltage of a current transformer 24 is applied across the resistor 23. The current transformer 24 is energized by the output current of the generator, so that the voltage and current of the generator are combined in the input to the transformer 22. The transformer 22 has two secondary windings 33 and 34 which are connected to single-phase rectifier bridges 25 and 26, respectively. The direct current outputs of the rectifiers 25 and 26 are connected to an adjustable resistor or potentiometer 27, and it can be shown that the direct-current voltage appearing across the resistor 27 is proportional to the power of the generator 1. It is to be understood that any other suitable network might be utilized or, in general, any power measuring means can be employed which will provide a direct-current output voltage proportional to the power of the generator.

Each generator is provided with a power measuring network 18, and the output voltages of the networks 18 are connected in series in a loop circuit by conductors 28 and 29 with the voltages opposing each other, as indicated on the drawing. A polarized relay 30 is provided for each generator having an operating coil 31 connected in the loop circuit between the networks 18, and having contacts 32 connected to complete an energizing circuit for the trip coil 6 of the corresponding circuit breaker. The relays 30 are connected to respond to current flow in opposite directions.

It will be seen that under normal conditions, when each generator is delivering the same power output, no current will flow in the loop circuit because the output voltages of the networks 18 will be equal in magnitude and opposite in direction. If the power of one generator, however, becomes less than that of the other, the output voltages of the networks 18 will no longer be equal and a circulating current will flow in the loop circuit, the magnitude of the circulating current being determined by the difference in power of the generators and the direction of the circulating current depending on which generator has the lower power. The polarized relays 30 are polarized in such a manner that one relay responds to current flow in one direction and the other one responds to current flow in the opposite direction. When the magnitude of the circulating current, therefore, reaches the value for which the relays are set, the polarized relay associated with the faulty generator will operate to energize the trip coil 6 of its circuit breaker and disconnect the generator from the system.

It will be noted that this system responds to the difference in power of the two generators and thus avoids the disadvantages which would result from using relays responsive directly to the power outputs of the generators. Thus, as previously explained, there may be a difference in the power outputs of the generators under light-load or no-load conditions, due to non-identical governor settings, and one machine may actually be absorbing power from the system under these conditions. The relays 30, however, can be set to respond to a current in the loop circuit above that corresponding to the expected difference in power under light-load conditions, and thus nuisance tripping under these conditions is avoided. As the load increases, if one of the generators is failing to carry its proper share of the load, or is running as a motor, the current in the loop circuit will increase, and the breaker of the faulty machine will be tripped as soon as the current has reached the setting of the relays. Thus, if the prime mover of one of the generators has stopped and the generator is running as a motor driving an overrunning clutch, it will be tripped off as soon as the load on the system increases sufficiently, but tripping will not occur under light-load conditions, even though the normal difference between the generators under light-load conditions may be of the same order as the power absorbed by a generator driving an overrunning clutch.

Figure 2:
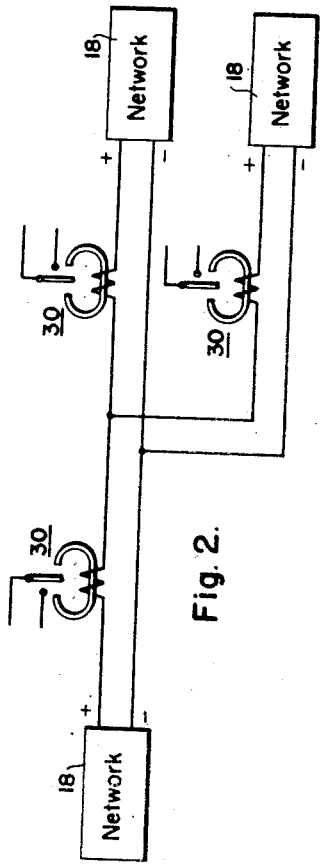
Fig. 2 is a fragmentary diagram illustrating the manner of applying the invention to systems of more than two generators.

The reverse power detecting means has been described above in connection with a two-generator system, but it will be obvious that it can readily be applied to systems including any number of generators operating in parallel. Thus, Fig. 2 shows diagrammatically three networks 18, which are associated with three paralleled generators, connected in such a manner that their output voltages oppose each other, so that normally no currents flow in the loop circuit connecting the networks. Upon the occurrence of reverse power in any one of the generators, however, or a difference in power outputs of the generators, a circulating current will flow which is in a direction to actuate the polarized relay 30 associated with the offending generator, but which will not actuate the other relays since it will be in the opposite relative direction with respect to them. Any number of networks 18, associated with any number of paralleled generators, may obviously be connected in this manner.

Figure 3:
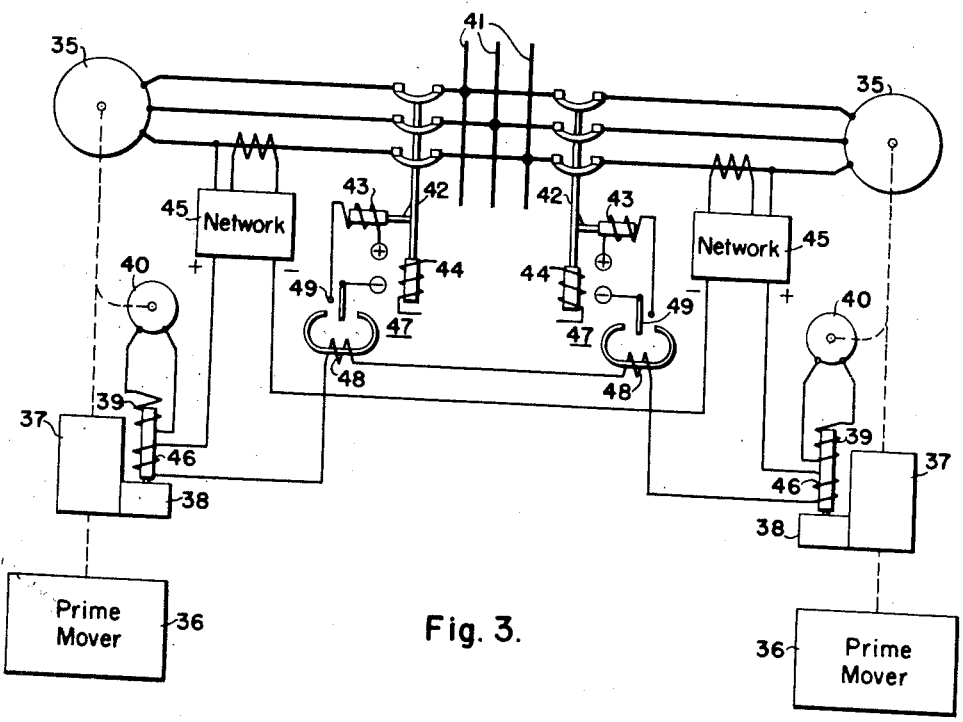
Fig. 3 is a schematic diagram showing an alternative embodiment of the invention.

The reverse power detection means described above is simple and reliable, and avoids any possibility of faulty tripping. This system has the further advantage that it can readily be utilized in conjunction with a governor control circuit to obtain the desired result at low cost and with a minimum of extra equipment. This is illustrated in Fig. 3, which shows a typical generator drive system such as is commonly used on aircraft. As shown in this figure, each of the generators 35 is driven by a driving means which includes a prime mover 36, such as an airplane engine, and a constant-speed drive or variable ratio transmission 37 which maintains the speed of the generator constant as the speed of the prime mover changes. The constant-speed drive 37 is controlled by a governor 38 to vary its ratio when the speed of the prime mover 36 changes, so as to maintain a constant output speed of the drive 37. Any suitable type of constant-speed drive and governor may be utilized, and the governor is shown as being controlled by a solenoid mechanism having a speed-responsive coil 39. The coil 39 is shown as being energized by the output voltage of a tachometer generator 40 driven from the output side of the drive 37, so as to provide an output voltage proportional to the generator speed. The speed coil 39 actuates the governor 38 to cause the drive 37 to maintain constant output speed.

The generators 35 are connected in parallel to a three-phase load bus 41 through circuit breakers 42 which are provided with trip coils 43 and closing coils 44. The division of load between the generator 35 is controlled by the settings of the governors 38, and in order to maintain the desired load division between the generators, a load equalizing circuit is utilized which includes power measuring networks 45, which may be similar to the network 18 described above. Each generator is provided with a power measuring network and the output voltages of the networks 45 are connected in opposition to each other in a loop circuit which also includes load-responsive coils 46 for each of the governors 38. It will be seen that when the power outputs of the two generators are the same, no current will flow in the load equalizing circuit, and the coils 46 will not affect the governors 38. If the power outputs of the generators 35 differ, however, a circulating current will flow in a direction to cause the coil 46 of one governor to change the governor setting in one direction, and the coil 46 of the other governor to change the governor setting in the opposite direction, so as to cause the generators to share the load equally.

It will be obvious that the operation of this circuit is similar to that of the loop circuit described above in connection with Fig. 1. Reverse power detection can, therefore, readily be obtained by providing a polarized relay 47 for each generator and connecting the operating coils 48 of the relays in series in the load equalizing circuit. The polarized relays 47 are connected to respond to current flow in opposite directions, and when current flows in the load equalizing circuit, indicating that the power output of one generator is less than that of the other, the relay 47 associated with the first-mentioned generator will operate to close its contacts 49 and energize the trip coil 43 of the corresponding circuit breaker 42 when the current reaches the magnitude for which the relays are set. Thus, the load equalizing circuit functions to actuate the governors 38 to maintain proper load division with normal variations, but the proper relay 47 is actuated if the current in the equalizing circuit exceeds the relay setting, indicating that one generator is failing to carry its share of the load, or is absorbing power from the system.

It will be readily apparent that this arrangement can be applied to systems of more than two generators in the same manner previously described and illustrated in Fig. 2.

By connecting the polarized relays 47 in a load equalizing circuit which forms part of the governor control, reverse power detection is obtained in a very simple and inexpensive manner, since the polarized relays themselves are the only added equipment required, and thus the cost is kept low, and the weight and space requirements are kept to a minimum, which is a very important consideration in aircraft equipment. This arrangement has the further advantage that false tripping cannot occur as a result of failure of the governor control.

It should now be apparent that means have been provided for detecting reverse power in a system of paralleled alternating current generators, or for detecting failure of one generator to carry its share of the load. The invention makes it possible to obtain this result in a relatively simple and inexpensive manner, but with great reliability and without the disadvantages of other possible methods, since the possibility of false tripping is avoided and any desired degree of sensitivity can be obtained. It will be apparent that various modifications are possible within the scope of the invention. Thus, if desired, the polarized relays might be provided with a time delay to prevent operation under transient conditions, and operation of the relays can be used to effect any desired action instead of, or in addition to, tripping the generator circuit breakers.

It is to be understood, therefore, that although certain specific embodiments of the invention have been shown and described for the purpose of illustration, the invention is not limited to the particular details shown, but includes all equivalent embodiments and modifications.

I claim as my invention:

1. In a system comprising a plurality of alternating-current generators connected for operation in parallel, means associated with each generator for providing a voltage proportional to the power of the generator, means for connecting said voltages of all the generators in a circuit with the voltages opposing each other, and means associated with each generator for effecting disconnection of the generator from the system in response to current flow in said circuit of a predetermined magnitude and direction.

2. In a system comprising a plurality of alternating-current generators connected for operation in parallel, power-measuring means associated with each generator for providing an output voltage proportional to the power of the generator, means for connecting the output voltages of all of said power-measuring means in a circuit with the voltages opposing each other, and relay means associated with each generator for effecting disconnection of the generator from the system in response to current flow in said circuit of a predetermined magnitude and direction.

3. In a system comprising a plurality of alternating-current generators connected for operation in parallel, power-measuring means associated with each generator for providing an output voltage proportional to the power of the generator, means for connecting the output voltages of all of said power-measuring means in a circuit with the voltages opposing each other, and a polarized relay associated with each generator for responding to current flow in said circuit of a predetermined magnitude and direction.

4. In a system comprising a plurality of alternating-current generators connected for operation in parallel, power-measuring means associated with each generator for providing an output voltage proportional to the power of the generator, means for connecting the output voltages of all of said power-measuring means in a circuit with the voltages opposing each other, and a polarized relay associated with each generator for effecting disconnection of the generator from the system in response to current flow in said circuit of a predetermined magnitude and direction.

5. In a system comprising a plurality of alternating-current generators connected for operation in parallel, a network connected to each generator for deriving an output voltage proportional to the power of the generator, means for connecting the output voltages of all of said networks in a circuit with the voltages opposing each other, and relay means associated with each generator for responding to current flow in said circuit of predetermined magnitude and direction.

6. In a system comprising a plurality of alternating-current generators connected for operation in parallel, a network connected to each generator for deriving an output voltage proportional to the power of the generator, means for connecting the output voltages of all of said networks in a circuit with the voltages opposing each other, and a polarized relay for each generator connected to effect disconnection of the generator from the system in response to current flow in said circuit of predetermined magnitude and direction.

7. In a system comprising a plurality of alternating-current generators connected for operation in parallel and driving means for each generator, the driving means having governors for regulating the speed of the generators, power-measuring means associated with each generator for providing an output voltage proportional to the power of the generator, means for connecting the output voltages of all of said power-measuring means in a circuit with the voltages opposing each other, means for actuating the governors in accordance with the magnitude and direction of current flow in said circuit, and relay means for each generator for effecting disconnection of the generator from the system in response to current flow in said circuit of predetermined magnitude and direction.

8. In a system comprising a plurality of alternating-current generators connected for operation in parallel and driving means for each generator, the driving means having governors for regulating the speed of the generators, a network connected to each generator for deriving an output voltage proportional to the power of the generator, means for connecting the output voltages of all of said networks in a circuit with the voltages opposing each other, means for actuating the governors in accordance with the magnitude and direction of current flow in said circuit, and a polarized relay for each generator connected to effect disconnection of the generator from the system in response to current flow in said circuit of predetermined magnitude and direction.

References Cited in the file of this patent

UNITED STATES PATENTS

| Number | Name | Date |
|---|---|---|
| 2,501,340 | Kresser | Mar. 21, 1950 |

FOREIGN PATENTS

| Number | Country | Date |
|---|---|---|
| 613,442 | Great Britain | Nov. 29, 1948 |